(No Model.)

W. J. PARMELEE.
CAR WHEEL.

No. 489,496.　　　　　　　　　　　Patented Jan. 10, 1893.

Witnesses　　　　　　　　　　　　　　Inventor
Jas. K. McCathran　　　　　　　　　Wolcott J. Parmelee
D. P. Walhaupter,　　By his Attorneys,
　　　　　　　　　　C. A. Snow & Co.

UNITED STATES PATENT OFFICE.

WOLCOTT JOHN PARMELEE, OF SCRANTON, PENNSYLVANIA; ADDELLA A. PARMELEE ADMINISTRATRIX OF SAID WOLCOTT JOHN PARMELEE, DECEASED.

CAR-WHEEL.

SPECIFICATION forming part of Letters Patent No. 489,496, dated January 10, 1893.

Application filed April 14, 1892. Serial No. 429,137. (No model.)

*To all whom it may concern:*

Be it known that I, WOLCOTT JOHN PARMELEE, a citizen of the United States, residing at Scranton, in the county of Lackawanna and State of Pennsylvania, have invented a new and useful Car-Wheel, of which the following is a specification.

This invention relates to car wheels; and it has for its object to provide an improved car wheel, which on account of the method of manufacture provides a thoroughly chilled wheel, while at the same time the particular construction thereof provides a wheel having much greater traction than ordinary car wheels, and thus particularly adapting the same for electric and mine cars, as well as railroad cars of all kinds, wherein it is an essential and highly important factor to have strong and durable wheels, which will not slip upon the track under any circumstances.

To this end it is the main object of the invention to improve upon the manufacture and construction of car wheels having such objects.

With these and many other objects in view which will readily appear as the nature of the invention is better understood, the same consists in the novel construction, combination and arrangement of parts hereinafter more fully described, illustrated and claimed.

Figure 1:
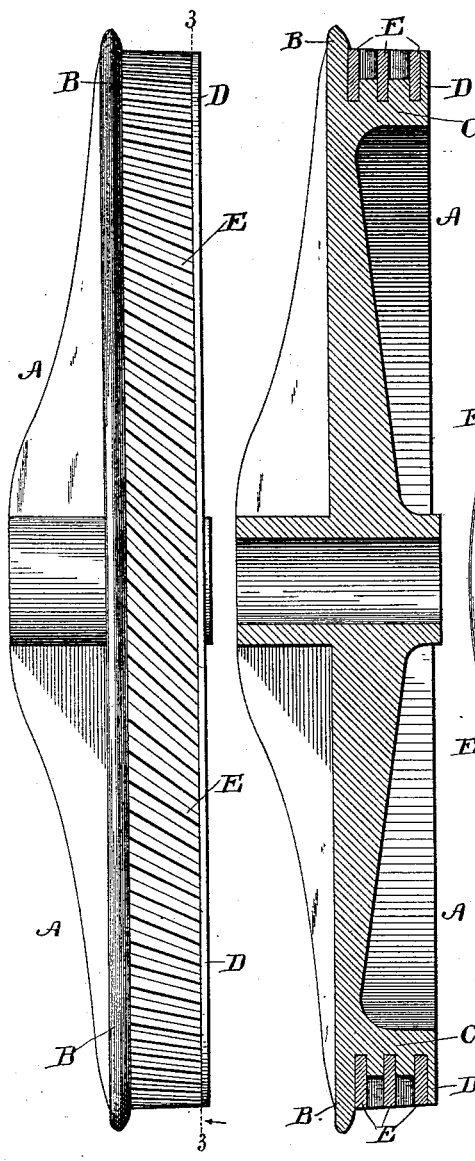
Figure 2:
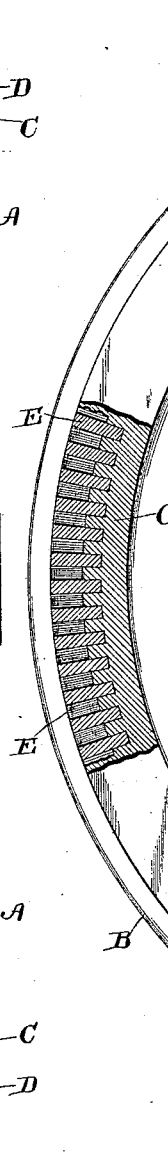
Figure 3:
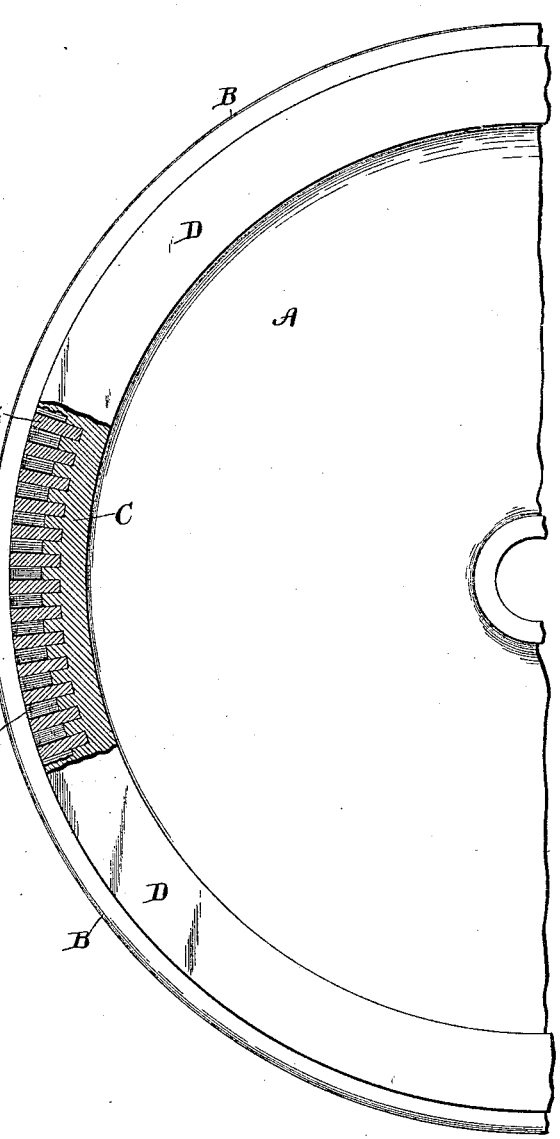

In the accompanying drawings;—Figure 1 is an end view of a car wheel constructed in accordance with the present invention. Fig. 2 is a vertical transverse sectional view of the same. Fig. 3 is a vertical sectional view on the line 3—3 of Fig. 1.

Referring to the accompanying drawings;— A represents a car wheel of the ordinary general construction cast in the ordinary molds, or any suitable mold adapted for the casting into the wheel of the supplemental and novel features thereof, forming the gist of the present invention. The said wheel A is provided with the ordinary flange B, and the tread body C, beyond which projects the outer cast rim D, extending flush with the tread of the wheel formed by the circumferential series of tread plates E cast in the tread body C. The core of the mold is so formed or arranged as to allow for the insertion therein, before the casting of the wheel, of the circumferential series of tread plates E. The said tread plates E are rectangular blocks or sections of cold wrought iron or steel, and are arranged parallel within the mold but diagonally with respect to the tread body C, designed to be cast there-around. The said plates are inserted any depth in the mold so that they may be cast into the body of the wheel any depth desired, and when the wheel is cast around said plates, the core of the mold leaves a space between the said plates beyond the tread body, so as to allow the said plates to have their edges project beyond the tread body C, and thus form a notched or corrugated diagonal tread for the wheel, which effectually prevents the same from slipping. The core also allows the rim D upon the outer face of the wheel to be flush with the tread of the wheel or the outer edges of the tread plates E of cold hard metal, and it will be also observed that the said plates are formed into the body of the wheel as a part thereof, so that the same not only are diagonally arranged to the body of the wheel and parallel with each other, but are parallel with the portions of the casting projecting between the same.

The wheel constructed as described not only provides for a construction having a hard, durable and non-slipping tread, but at the same time the manufacture of this wheel involves an important and easy method of giving to the cast wheel the requisite chill. It will be readily seen that the cold hard plates which are placed in the mold form a chill for the entire wheel. When the melted metal is poured into the mold around the cold tread plates, according to the depth of insertion of such plates, the melted metal is chilled to any depth desired, and inasmuch as the said plates are of hard cold metal and the soft melted metal is cast around the same, the cast metal is made extremely hard and thus provides a wheel having better lasting qualities, greater traction, and one which will give far better results than the ordinary cast chilled wheel.

It is thought that the construction, and the many advantages of the herein described wheel are now apparent to those skilled in the art.

To reiterate the advantages and construction of the car wheel herein described it may be further stated that the corrugated tread of the wheel is formed by casting diagonally arranged steel tread plates into the body of the wheel, so that the same will project beyond the cast iron body of the wheel from one-half to one-inch, thus forming a steel corrugated tread which not only prevents the car from jarring but also prevents the wheel from slipping, and one which has exceptional durability and lasting qualities.

Having thus described my invention, what I claim and desire to secure by Letters Patent is:—

1. In the manufacture of car wheels, the method of forming the tread which consists in casting a circumferential series of cold hard metallic plates into the body of the wheel any desired distance so as to chill the wheel to a predetermined depth, and causing the remaining portion, that is not embedded in the wheel, to project beyond the same and form a corrugated surface, substantially as set forth.

2. A car wheel having a series of plates cast in the body thereof to form the tread of the wheel, substantially as set forth.

3. A car wheel having a circumferential series of parallel plates cast therein to form the tread, substantially as set forth.

4. A car wheel having a series of parallel cold metallic plates cast into the body thereof and projecting beyond the same to form a tread, substantially as set forth.

5. A car wheel having a circumferential series of parallel diagonally arranged metallic plates cast therein to form the tread, substantially as set forth.

6. A car wheel having a series of parallel diagonally arranged cold steel plates cast into the body thereof and having spaces between the same to form a notched or corrugated tread for the wheel, substantially as set forth.

7. A car wheel having a circumferential series of diagonally arranged and regularly spaced steel plates cast into the body thereof and projecting beyond the same in parallel planes with the portions of the cast metal therebetween, to form the tread of the wheel, substantially as set forth.

In testimony that I claim the foregoing as my own I have hereto affixed my signature in the presence of two witnesses.

WOLCOTT JOHN PARMELEE.

Witnesses:
J. M. KEMMERER,
M. P. ZEIDLER.